March 25, 1941.                R. BERRIER                2,235,974
                              WEATHER STRIP
                           Filed Dec. 14, 1938
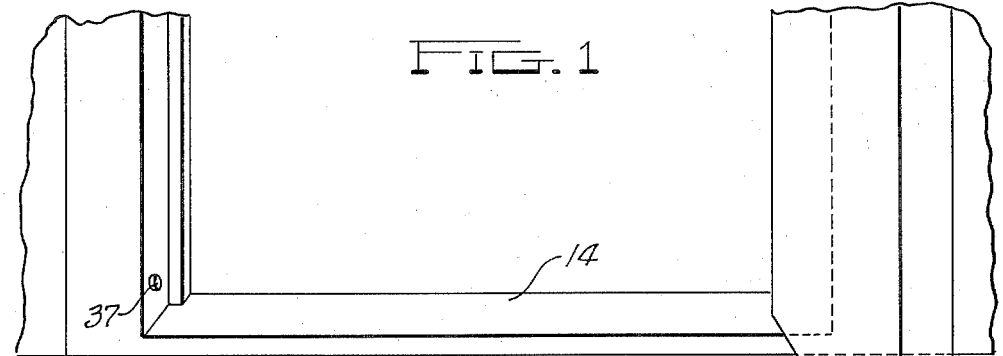
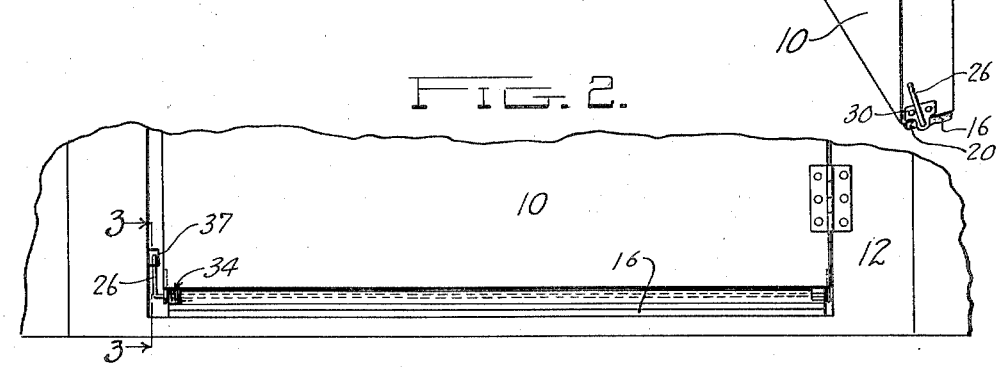
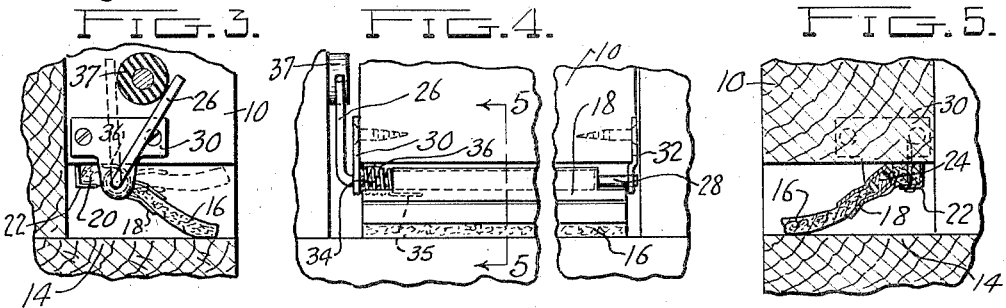
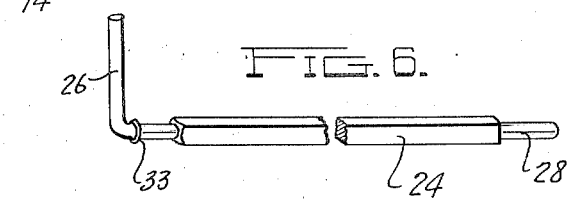 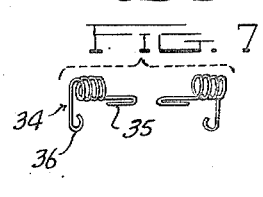
Inventor
Roscoe Berrier
Owen & Owen
Attorneys Patented Mar. 25, 1941

2,235,974

UNITED STATES PATENT OFFICE 2,235,974

WEATHER STRIP

Roscoe Berrier, Toledo, Ohio

Application December 14, 1938, Serial No. 245,692

1 Claim. (Cl. 20—67)

This invention relates to weather strips, and particularly to those of the automatically movable type used under interior doors, casement windows, and the like.

Weather strips which are easily installed under doors and which move into effective position upon closing of the doors have been previously characterized by the disadvantages that any given unit was not readily interchangeable for doors hinged either on the right or left side nor were the units effectively applicable to doors having irregular under surfaces.

An object of the present invention consists in the provision of a novel unit which may be applied to the under side of a door hinged either on the right or left side and which, when applied, effectively closes a space beneath a door regardless of the contour of the door.

Another object of the invention is the provision of a simple and efficient operating mechanism for a weather strip of this character which is capable of moving the strip into sealing position when the door is closed and into retracted position when the door is opened.

Other objects and advantages of the invention will become apparent as the description proceeds, reference being had to the accompanying drawing, in which—

Figure 1 is a fragmentary perspective view of a door casing and door equipped with a weather strip in accordance with the present invention and with the door in open position; Fig. 2 is a fragmentary elevation thereof with the door in closed position; Fig. 3 is an enlarged section on line 3—3 in Fig. 2; Fig. 4 is an enlarged fragmentary view similar to Fig. 2; Fig. 5 is a section on the line 5—5 in Fig. 4; Fig. 6 is a perspective view, partly broken away, of a strip operator, and Fig. 7 is a detail of the strip operator retracting springs in assembled relation.

Referring to the drawing, the invention is shown as applied to a door 10 hinged to a casing 12 and movable over a sill 14. It is the opening between the sill 14 and the door 10 which is to be closed by the weather strip provided by the present invention.

The movable portion of the weather strip includes a rectangular strip 16 which may be of felt, rubber, or similar flexible material and be retained in a channel member 18. The flexible strip 16 is preferably held in place by crimping the sides of the channel member into engagement therewith and the strip is spaced from the bottom of the channel so as to leave an opening between the innermost portion of the strip 16 and the bight portion of the channel member 18.

An operating bar 24 having its major portion square is provided and is adapted to be slipped into the bight portion of the channel member 18 in the space behind the innermost end of the flexible strip 16. At one end the bar 24 is provided with an upwardly projecting lever arm 26, and at its opposite end is provided with a reduced, round, bearing portion 28.

For the purpose of mounting the movable portion of the weather strip under a door or the like, end brackets 30 and 32 are provided which are to be screwed into the door at its lower end. The end bracket 32 is provided with an inwardly offset lower portion which is adapted to receive the bearing 28. It will be seen that the bearing 28 may project through the offset portion of the bracket for a distance at least equal to the offset dimension so that there is little danger of the bearing being pulled out of the bracket once it is positioned.

The lever end of the operating bar 24 is provided with a shoulder 33 which cooperates with the end bracket 30 to prevent lateral movement of the bar and which further serves to aid in the positioning of a retracting spring 34. The spring 34 has a projecting end 35 which is received under the square portion of the operating bar and is further provided with a projection 36 which lies against the under surface of the door. The spring is wound in such a direction that the force exerted thereby tends to move the weather strip to retracted position, flat against the bottom of the door as shown in dotted lines in Fig. 3.

The flexible strip and its channel holder rotate into and out of effective position so that it is necessary to space the axis of rotation slightly below the bottom of the door 10. While interior doors, casement windows, and the like, usually are relatively even in their bottom contour, it frequently happens that various fitting operations have changed the contour so that the lower surface of the door or window is undulating. For this reason a stationary strip 20, of felt, rubber, or the like, is provided immediately adjacent the bight portion of the channel member 18 and is provided with a relatively flexible L-shaped carrier 22. The stationary strip and its carrier may be bent and made to conform exactly to the under surface of the door or window so that it is not necessary to bend the channel member 18 when the under surface of the door is uneven.

Since it is necessary to mount the weather strips on doors which may be hinged so as to swing from the right or from the left, while opening in the same direction, the assembly must be easily reversible. It will be apparent that the assembly may be reversed merely by sliding the operating bar 24 out of the channel member and inserting it in the opposite end. Since this reversal will require the retracting spring to exert a force in the opposite direction, two oppositely wound springs are provided as shown in Fig. 7. The user may thus select the proper spring for his particular application. The operating bar 24 provides a positive and efficient means to rotate the flexible strip away from the door and makes its operating connection with the flexible strip merely by conforming to the shape of the bight portion of the channel member 18.

A stationary striker 37 is fixed to the door frame in the path of the lever arm 26. It will be seen that a closing movement of the door brings the arm 26 into engagement with the striker 37, causing rotation of the lever and thus swinging the flexible strip down into engagement with the sill 14 of the door opening.

It will be apparent that the present invention is equally applicable to doors hinged on the right or left side, and that a given unit may be placed on either type of door merely by withdrawing the operating bar 24 and inserting it in the opposite end of the channel member. It will be further apparent that, even though the under surface of the door is undulating, the space behind the movable strip, which is necessarily straight, is adequately filled by the stationary portion 20 which may be fixed to the door in any suitable manner, as by nailing it in place.

While the present invention has been described in connection with a particular form and arrangement of the parts, it will be appreciated that various changes may be made therein without departing from the invention as defined in the appended claim.

What I claim as new and desire to secure by United States Letters Patent is:

Means to seal an opening between a door and casing or the like, including, a movable weather strip consisting of a resilient body and a channel shaped holder for said body, said body being carried spaced from the bight portion of said holder, an operator having a portion rectangular in cross-section removably engaged in and conforming to the shape of said holder and being insertable into either end thereof, a lever carried by one end of said operator, means to mount said movable strip on a door in position to be projected into the opening to be closed, removable spring means normally urging said movable strip against the door and means carried by the casing in the path of said lever whereby a closing movement of the door causes a rotation of said operator against the tension of said spring and a projection of said resilient strip into the opening to be closed.

ROSCOE BERRIER.